United States Patent
Kim et al.

(10) Patent No.: US 10,261,382 B2
(45) Date of Patent: Apr. 16, 2019

(54) LIGHT MODULATION DEVICE

(71) Applicant: ELECTRONICS AND TELECOMMUNICATIONS RESEARCH INSTITUTE, Daejeon (KR)

(72) Inventors: Tae-Youb Kim, Daejeon (KR); Yong Hae Kim, Daejeon (KR); Seong-Mok Cho, Daejeon (KR); Jong-Heon Yang, Daejeon (KR); Jae-Eun Pi, Daejeon (KR)

(73) Assignee: Electronics and Telecommunications Research Instit, Daejeon (KR)

( * ) Notice: Subject to any disclaimer, the term of this patent is extended or adjusted under 35 U.S.C. 154(b) by 26 days.

(21) Appl. No.: 15/353,682

(22) Filed: Nov. 16, 2016

(65) Prior Publication Data

US 2017/0176834 A1     Jun. 22, 2017

(30) Foreign Application Priority Data

Dec. 22, 2015  (KR) .................. 10-2015-0183942
Mar. 10, 2016  (KR) .................. 10-2016-0028969

(51) Int. Cl.
*G02F 1/29*     (2006.01)
*G02F 1/153*    (2006.01)
(Continued)

(52) U.S. Cl.
CPC .............. *G02F 1/161* (2013.01); *B60R 1/088* (2013.01); *G02F 1/01* (2013.01); *G02F 1/15* (2013.01); *G02F 1/1523* (2013.01); *G02F 1/29* (2013.01); *G09G 3/38* (2013.01); *G02F 1/1525* (2013.01); *G02F 2001/1536* (2013.01)

(58) Field of Classification Search
CPC . G02F 1/01; G02F 1/15; G02F 1/1523; G02F 1/1525; G02F 1/153; G02F 1/155; G02F 1/157; G02F 1/161; G02F 1/29; G02F 2001/1525; G02F 2001/1536; G02F 2001/1552; G02F 2201/44; G02F 2203/09; G02F 2203/11; G09G 3/19; G09G 3/38; B60R 1/088; G02B 27/00
USPC ....... 359/265, 267, 270, 275, 279, 316, 558, 359/563, 566; 345/49, 105; 428/432, 428/442
See application file for complete search history.

(56) References Cited

U.S. PATENT DOCUMENTS 5,274,493 A * 12/1993 Couput ................ G02F 1/1525
                                                        204/192.1
5,818,636 A * 10/1998 Leventis ................ C09K 9/02
                                                        359/273
(Continued)

FOREIGN PATENT DOCUMENTS

KR   10-2013-0073354 A   7/2013
KR   10-2015-0066944 A   6/2015
KR       10-1630118 B1   6/2016

OTHER PUBLICATIONS

Peiman Hosseini et al., "An optoelectronic framework enabled by low-dimensional phase-change films", Nature, Jul. 10, 2014, pp. 206-211, vol. 511, Macmillan Publishers Limited.

*Primary Examiner* — Loha Ben

(57) ABSTRACT

Provided is a light modulating device including a light modulating unit provided on a substrate, a driving unit electrically connected to the light modulating unit and configured to drive the light modulating unit, and a cover disposed on the light modulating unit and configured to seal the light modulating unit, wherein the light modulating unit comprises an electrochromic device.

15 Claims, 5 Drawing Sheets

(51) Int. Cl.
*G02F 1/01* (2006.01)
*G02F 1/15* (2019.01)
*G02F 1/161* (2006.01)
*G09G 3/38* (2006.01)
*B60R 1/08* (2006.01)
*G02F 1/1523* (2019.01)

(56) References Cited

U.S. PATENT DOCUMENTS

| | | | | |
|---|---|---|---|---|
| 6,597,489 B1* | 7/2003 | Guarr | ............... | G02F 1/155 |
| | | | | 359/265 |
| 6,606,184 B2* | 8/2003 | Guarr | ............... | G02F 1/155 |
| | | | | 359/265 |
| 7,649,668 B2* | 1/2010 | Fanton | ............ | B32B 17/10036 |
| | | | | 345/105 |
| 8,115,985 B2* | 2/2012 | Liu | ............... | G02B 27/2214 |
| | | | | 359/273 |
| 8,213,074 B1* | 7/2012 | Shrivastava | ......... | E06B 9/24 |
| | | | | 359/275 |
| 8,284,242 B2* | 10/2012 | Wang | ............ | H04N 13/31 |
| | | | | 348/51 |
| 8,368,993 B2* | 2/2013 | Yeh | ............... | G02B 27/2214 |
| | | | | 359/273 |
| 8,692,765 B2* | 4/2014 | Yeh | ............... | G02B 27/2264 |
| | | | | 345/156 |
| 9,507,233 B2* | 11/2016 | Bergh | ............ | G02F 1/153 |
| 9,606,411 B2* | 3/2017 | Bergh | | |
| 2015/0177686 A1 | 6/2015 | Lee et al. | | |
| 2015/0323817 A1 | 11/2015 | Kim et al. | | |

* cited by examiner

LIGHT MODULATION DEVICE

CROSS-REFERENCE TO RELATED APPLICATIONS

This U.S. non-provisional patent application claims priority under 35 U.S.C. § 119 of Korean Patent Application Nos. 10-2015-0183942, filed on Dec. 22, 2015, and 10-2016-0028969, filed on Mar. 10, 2016, the entire contents of which are hereby incorporated by reference.

BACKGROUND

The present disclosure herein relates to a light modulation device, and more particularly, to a spatial light modulation device.

In order to realize digital hologram, spatial light modulators (SLMs) are widely used. Currently released SLMs may be divided into an amplitude type and a phase type and between them, phase type SLMs having a better diffraction efficiency are mainly used. However, since a realizable pixel pitch size of the phase type SLM is limited, it is required to realize the SLM with a finer pixel pitch.

SUMMARY

The present disclosure provides a light modulation device capable of realizing a fine pitch to secure a wide viewing angle.

Issues to be addressed in the present disclosure are not limited to those described above and other issues unmentioned above will be clearly understood by those skilled in the art from the following description.

An embodiment of the inventive concept provides a light modulation device including: a light modulating unit provided on a substrate; a driving unit electrically connected to the light modulating unit and configured to drive the light modulating unit; and a cover disposed on the light modulating unit and configured to seal the light modulating unit, wherein the light modulating unit may include an electrochromic device.

In an embodiment, an internal space may be provided between the cover and the light modulating unit, and a sealing gas including hydrogen may be provided to the internal space.

In an embodiment, the sealing gas may further include an inert gas.

In an embodiment, the electrochromic device may include: first and second electrodes; a first electrochromic layer disposed on the first electrode; a second electrochromic layer disposed under the second electrode; and an electrolyte layer between the first and second electrochromic layers, wherein each of the first and second electrodes, each of the first and second electrochromic layers, and the electrolyte layer are provided in a solid state.

In an embodiment, the electrochromic device may include: first and second electrodes; a first electrochromic layer disposed on the first electrode; a second electrochromic layer disposed under the second electrode; an electrolyte layer between the first and second electrochromic layers; and a hydrogen absorption film between the electrolyte layer and at least one of the first and second electrochromic layers.

In an embodiment, the light modulation device may further include: a protection layer laminated on the substrate, wherein the light modulating unit is provided inside the protection layer.

In an embodiment, the electrochromic device may be provided in plurality.

In an embodiment of the inventive concept, a light modulation device includes: electrochromic devices that are two-dimensionally arranged on a substrate; a driving unit for driving the electrochromic devices; and a protection layer laminated on the substrate and configured to protect the electrochromic devices, wherein each of the electrochromic devices is provided in a solid state.

In an embodiment, the light modulation device may include: a cover configured to seal the electrochromic devices, wherein a sealing gas may be provided to internal spaces between the cover and the electrochromic devices, and the sealing gas may include at least one of hydrogen and an inert gas.

Specific items of other embodiments are included in the detailed description and drawings of the present disclosure.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Figure 1:
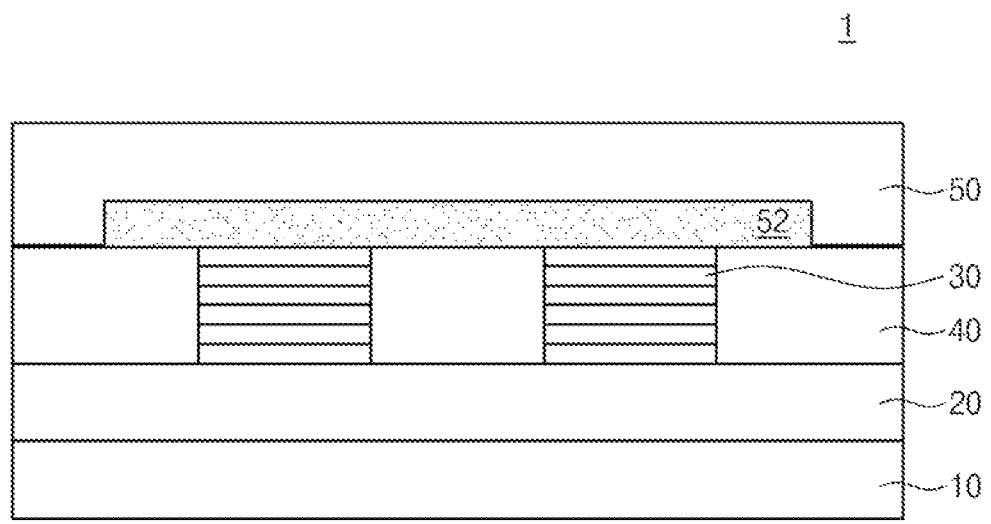
FIG. 1 is a cross-sectional view of a light modulation device according to an embodiment of the inventive concept.

Advantages and features of the present invention, and methods for achieving the same will be cleared with reference to exemplary embodiments described later in detail together with the accompanying drawings. However, the present invention is not limited to the following exemplary embodiments, but realized in various forms. In other words, the present exemplary embodiments are provided just to complete disclosure the present invention and make a person having an ordinary skill in the art understand the scope of the invention. The present invention should be defined by only the scope of the accompanying claims. Throughout this specification, like numerals refer to like elements.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising" used herein specify the presence of stated components, operations and/or elements but do not preclude the presence or addition of one or more other components, operations and/or elements.

Example embodiments are described herein with reference to cross-sectional views and/or plan views that are schematic illustrations of example embodiments. In the drawings, the thicknesses of layers and regions are exaggerated for clarity. As such, variations from the shapes of the illustrations as a result, for example, of manufacturing techniques and/or tolerances, are to be expected. Thus, example embodiments should not be construed as limited to the particular shapes of regions illustrated herein but may be to include deviations in shapes that result, for example, from manufacturing. Thus, the regions illustrated in the figures are schematic in nature and their shapes may be not intended to illustrate the actual shape of a region of a device and are not intended to limit the scope of example embodiments.

FIG. 1 is a cross-sectional view of a light modulation device 1 according to an embodiment of the inventive concept. The light modulation device 1 may be a spatial light modulator (SLM). Referring to FIG. 1, the light modulation device 1 may include a substrate 10, a driving unit 20, a light modulating unit 30, a protection layer 40, and a cover 50.

The substrate 10 may include glass or silicon. The driving unit 20 may be provided on the substrate 10. The driving unit 20 may be electrically connected to a light modulating unit 30 to drive the light modulating unit 30. Although not illustrated, the driving unit 20 may include a driving device, for example, a thin film transistor (TFT). In addition, the driving unit 20 may include interconnections (not illustrated) for connecting a driving device and the light modulating unit 30. In the drawings, it is exemplarily illustrated that the driving unit 20 is provided in a size to correspond to the substrate 10, but the driving unit 20 may be partially provided on the substrate 10.

The light modulating unit 30 may be provided on the substrate 10. Referring to FIG. 1, the light modulating unit 30 may be provided on the driving unit 20. The light modulating unit 30 may be an electrochromic device 30. The electrochromic device 30 may be provided in plurality. The plurality of electrochromic devices 30 may be arranged two-dimensionally on the driving unit 20 in an array type. In FIG. 1, two electrochromic devices 30 are exemplarily illustrated but the number and array of the electrochromic devices 30 are not limited thereto.

Figure 2A:
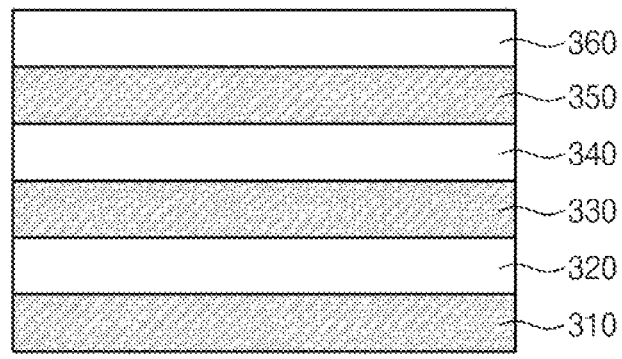
FIG. 2A illustrates an electrochromic device according to an embodiment of the inventive concept.

FIG. 2A illustrates an electrochromic device 30 according to an embodiment of the inventive concept. Referring to FIGS. 1 and 2A, the electrochromic device 30 may include a metal mirror 310, a first electrode 320, a first electrochromic layer 330, an electrolyte layer 340, a second electrochromic layer 350, and a second electrode 360, which are sequentially stacked. The metal mirror 310 may be connected to the driving unit 20. When the metal mirror 310 is provided, the electrochromic device 30 may be a reflective electrochromic device. Unlike this, when the electrochromic device 30 is a transmissive electrochromic device, the metal mirror 310 may be omitted.

The first electrode 320 may be disposed on the metal mirror 310. The top surface of the second electrode 360 may be exposed from the protection layer 40. Each of the first and second electrodes 320 and 360 may be in a solid state. Each of the first and second electrodes 320 and 360 may be a transparent electrode. For example, each of the first and second electrodes 320 and 360 may include indium tin oxide (ITO) or fluorine doped tin oxide (FTO). Although not illustrated, each of the first and second electrodes 320 and 360 is patterned to include a plurality of sub-electrodes (not illustrated).

The first electrochromic layer 330 may be disposed on the first electrode 320. The second electrochromic layer 350 may be disposed under the second electrode 360. The second electrochromic layer 350 may be opposite to the first electrochromic layer 330. Each of the first and second electrochromic layers 330 and 350 may be in a solid state. Although not illustrated, the first electrochromic layer 330 includes electrochromic materials (not illustrated) and the second electrochromic layer 350 may include complementary materials (not illustrated) such as ion storage materials or electrochromic materials. The electrochromic materials (not illustrated) are materials causing electrochromism through a redox process according to injection and detachment of electrons and ions. The first and second electrochromic layers 330 and 350 may perform interactive reaction corresponding to each other. For example, when the first electrochromic layer 330 is an oxidized color change electrode layer, the second electrochromic layer 350 may be a reduced color change electrode layer. Unlike this, when the first electrochromic layer 330 is a reduced color change electrode layer, the second electrochromic layer 350 may be an oxidized color change electrode layer. The first electrochromic layer 330 may include various types of oxides including antimony-doped tin oxide (ATO), NiO, WO3, TiO2, and ZnO, or organic molecules of various structures including Triarylamine series, Viologen series, polymers, and organic molecules, and the second electrochromic layer 350 may include various types of oxides including NiO, WO3, TiO2, and ZnO, or organic molecules of various structures including Triarylamine series, Viologen series, polymers, and organic molecules.

The electrolyte layer 340 may be provided between the first and second electrochromic layers 330 and 350. The electrolyte layer 340 may be solid, but is not limited thereto, and may be liquid or in a gel type. For example, the electrolyte layer 340 may include $Ta_2O_5$. Unlike this, the electrolyte layer 340 may include hydrogen ions $H^+$. Unlike these, the electrolyte layer 340 may be provided as polymer or solid porous electrolyte. The electrolyte layer 340 may deliver ions between the first and second electrochromic layers 330 and 350. According to voltages applied to the first and second electrodes 320 and 360, hydrogen ions $H^+$ or lithium ions $Li^+$ included in the electrolyte layer 340 are inserted into or extracted from the first and second electrochromic layers 330 and 350. At this point, in order to satisfy a charge neutrality condition, the oxidation numbers of the first and second electrochromic layers 330 and 350 are changed and optical characteristics (e.g. transmittance) of the first and second electrochromic layers 330 and 350 themselves are also changed.

Figure 2B:
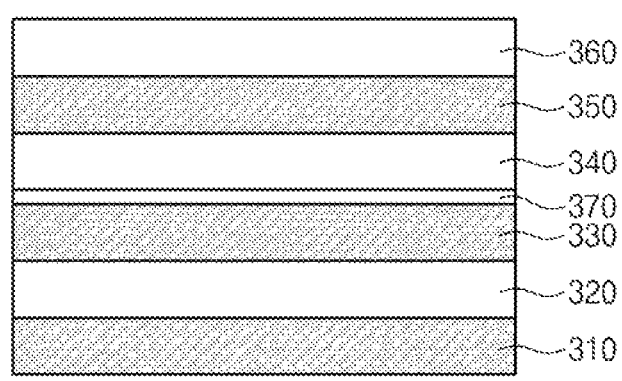
FIG. 2B illustrates an electrochromic device according to another embodiment of the inventive concept.

FIG. 2B illustrates an electrochromic device 30a according to another embodiment of the inventive concept. Referring to FIG. 2B, the electrochromic device 30a may include a metal mirror 310, a first electrode 320, a first electrochromic layer 330, a hydrogen absorption film 370, an electrolyte layer 340, a second electrochromic layer 350, and a second electrode 360. The electrochromic device 30a of FIG. 2B largely has an identical or similar structure and shape to those of the electrochromic device 30 having been described in relation to FIG. 2A. Accordingly, identical reference numerals are given to substantially identical components to those of the electrochromic device having been described in relation to FIG. 2A and overlapping descriptions will be omitted for conciseness of explanation. The electrochromic device 30a may further include the hydrogen absorption film 370. The hydrogen absorption film 370 may be provided between the electrolyte layer 340 and at least one of the first and second electrochromic layers 330 and 350. For example, referring to FIG. 2B, the hydrogen absorption film 370 may be provided between the first electrochromic layer 330 and the electrolyte layer 340. The hydrogen absorption film 370 may include a material capable of absorbing and passing hydrogen. For example, the hydrogen absorption film 370 may include palladium (Pd). Between the first electrochromic layer 330 and the electrolyte layer 340, the hydrogen absorption layer 370 may expedite movement of hydrogen ions to reinforce the electrochromic characteristic.

Referring to FIG. 1 again, the protection layer 40 for protecting the light modulating unit 30 may be provided on the driving unit 20. The protection layer 40 may enclose the plurality of electrochromic devices 30 to protect the electrochromic devices 30. The protection layer 40 may include a polymer. As illustrated in FIG. 1, the top surface of the protection layer 40 may form a coplane with the top surfaces of the electrochromic devices 30.

The cover 50 for sealing the light modulating unit 30 is provided on the light modulating unit 30. The cover 50 may be formed from a transparent material such that light is incident to the light modulating unit 30. For example, the cover 50 may include glass. An internal space 52 is formed between the cover 50 and the light modulating unit 30. The internal space 52 may be filled with a sealing gas. For example, the sealing gas may include at least one of hydrogen and an inert gas. The electrochromic devices 30 are sealed with the sealing gas to protect the electrochromic devices 30 from an external stimulus.

For a typical phase type light modulator, the light modulation layer may be provided with liquid crystal (LC). For example, the phase type light modulator may include parallel aligned nematic LC (PAN-LC), an LC anode, and an LC cathode. At this point, the light modulation layer may have a predetermined thickness. For example, the width in a vertical direction of the phase type light modulator may be about 10 μm or more. Accordingly, since the width in the vertical direction is thick, the realizable width in a horizontal direction of the light modulation layer is restrictive. According to the inventive concept, in the light modulation device 1 including any one of the electrochromic devices 30, each of the electrochromic devices 30 and 30a may be manufactured in a thin film type. For example, the electrochromic devices 30 and 30a may be manufactured by forming the protection layer 40 on the substrate 10 and the driving unit 20, and patterning the protection layer 40. At this point, the widths in the vertical direction of the protection layer 40 and the electrochromic devices 30 may be about 3 μm to about 5 μm. Accordingly, the widths in the horizontal direction of the electrochromic devices 30 are formed small and fine pixel pitches may be realized. The pixel pitch is a distance from one electrochromic device 30 to an adjacent electrochromic device 30 and may be influenced by the width in the vertical direction of the electrochromic device 30. The light modulation device 1 according to an embodiment of the inventive concept may realize a fine, for example, about 1 μm or smaller pixel pitch. Accordingly, the light modulation device 1 according to the embodiment of the inventive concept may secure a wider viewing angle than a typical phase type light modulator.

Figure 3A:
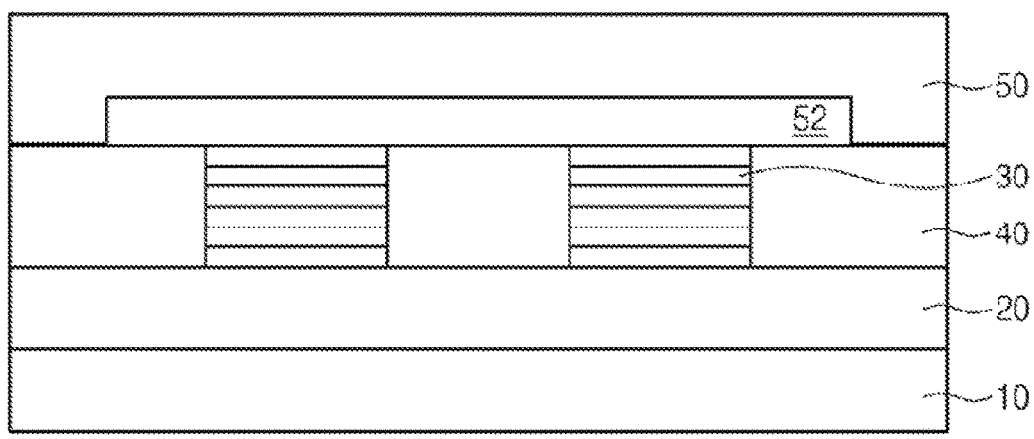
FIG. 3A is a cross-sectional view of a light modulation device according to an embodiment of the inventive concept.
Figure 3B:
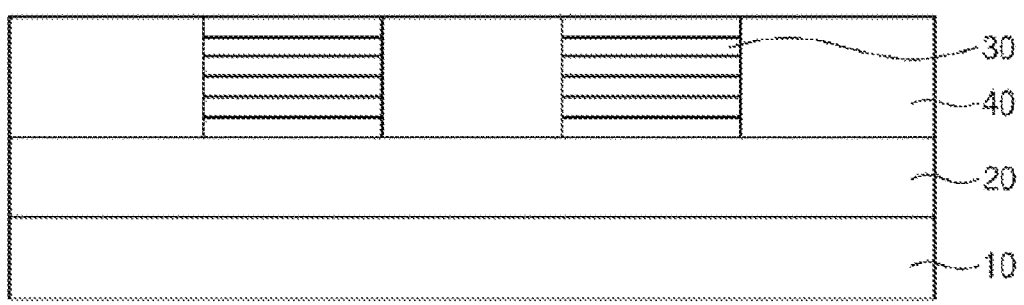
FIG. 3B is a cross-sectional view of a light modulation device according to another embodiment of the inventive concept.

FIG. 3A is a cross-sectional view of a light modulation device 2 according to an embodiment of the inventive concept. FIG. 3B is a cross-sectional view of a light modulation device 3 according to another embodiment of the inventive concept. Each of the light modulating devices 2 and 3 of FIGS. 3A and 3B largely has an identical or similar structure and shape to those of the light modulation device 1 described in relation to FIGS. 1 and 2B. Accordingly, identical reference numerals are given to substantially identical components to those of the light modulation device 1 having been described in relation to FIGS. 1 and 2B, and overlapping descriptions will be omitted for conciseness of explanation. Each of light modulation devices 2 and 3 of FIGS. 3A and 3B may include any one of the electrochromic devices 30 and 30a of FIGS. 2A and 2B. The light modulation device 2 of FIG. 3A may not include a sealing gas in the internal space 52. Unlike this, in the light modulation device 3 of FIG. 3B, a cover may be omitted and the light modulating unit 30 may be exposed externally.

Figure 4A:
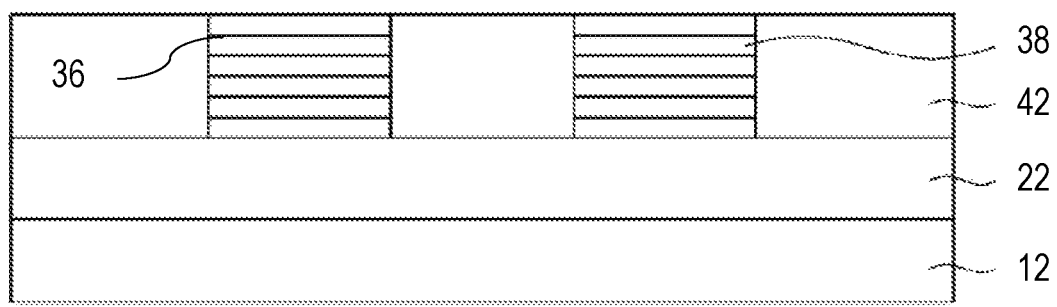
FIG. 4A is a cross-sectional view of a light modulation device according to an embodiment of the inventive concept.
Figure 4B:
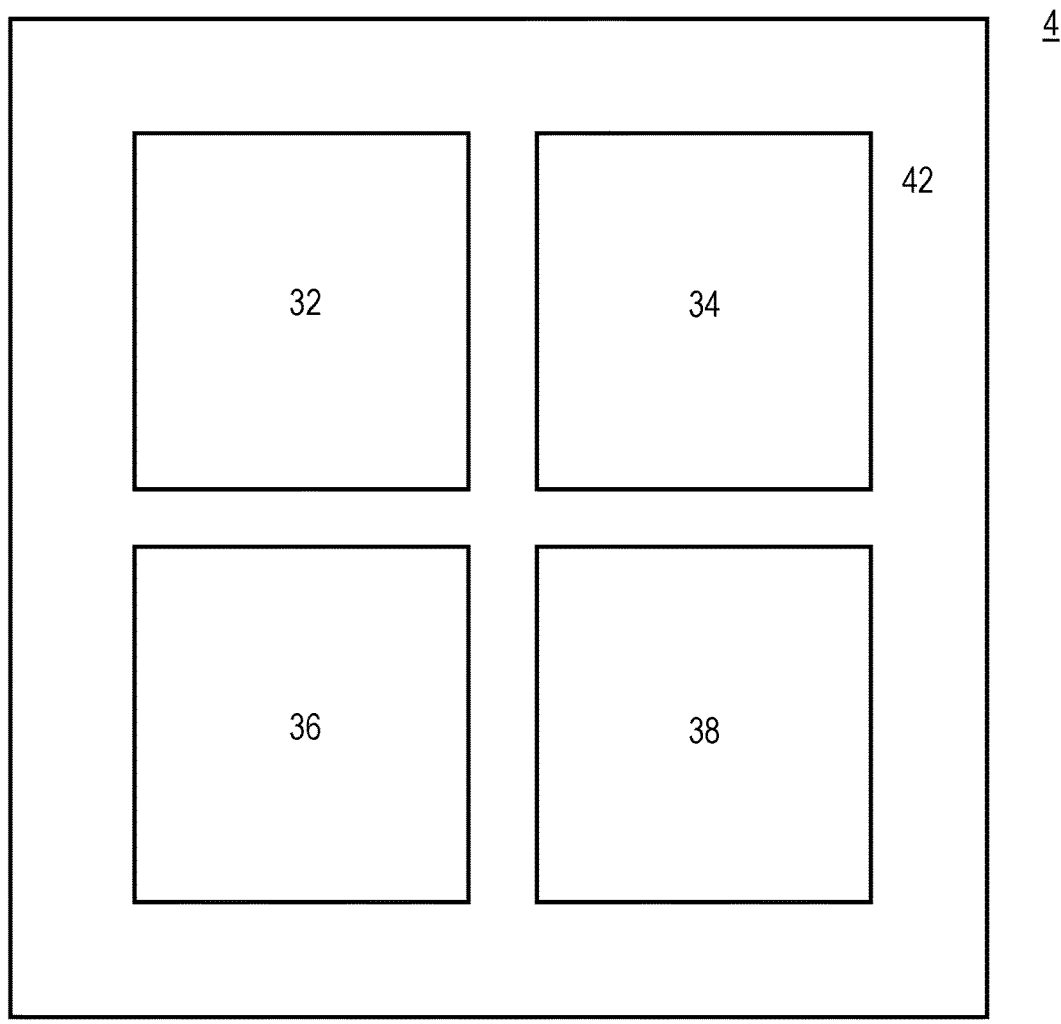
FIG. 4B is a plan view of a light modulation device according to an embodiment of the inventive concept.

FIG. 4A is a cross-sectional view of a light modulation device 4 according to an embodiment of the inventive concept; and FIG. 4B is a plan view of the light modulation device 4 according to an embodiment of the inventive concept. The light modulation device 4 may include a substrate 12, a driving unit 22, a plurality of light modulating units 32, 34, 36, and 38, and a protection layer 40. As illustrated, the plurality of light modulating units 32, 34, 36, and 38 are two-dimensionally arrayed on the substrate 12 in two directions, e.g., an x direction and a y direction. The plurality of light modulating units 32, 34, 36, and 38 are disposed above the substrate 12 in a third direction, e.g., a z direction.

According to embodiments of the present disclosure, a light modulation device, which may realize a fine pitch to secure a wide viewing angle, may be provided.

Although the exemplary embodiments of the present invention have been described, it is understood that the present invention may be implemented as other concrete forms without changing the inventive concept or essential features. Therefore, these embodiments as described above are only proposed for illustrative purposes and do not limit the present invention.

What is claimed is:

1. A light modulation device comprising:
   a light modulating unit provided on a substrate;
   a driving unit electrically connected to the light modulating unit and configured to drive the light modulating unit; and
   a cover disposed on the light modulating unit and configured to seal the light modulating unit,
   wherein the light modulating unit comprises an electrochromic device, and
   wherein an internal space is provided between the cover and the light modulating unit, and a sealing gas comprising hydrogen is provided to the internal space.

2. The light modulation device of claim 1, wherein the sealing gas further comprises an inert gas.

3. The light modulation device of claim 1, wherein the electrochromic device comprises:
   first and second electrodes;
   a first electrochromic layer disposed on the first electrode;
   a second electrochromic layer disposed under the second electrode; and
   an electrolyte layer between the first and second electrochromic layers,
   wherein each of the first and second electrodes, each of the first and second electrochromic layers, and the electrolyte layer are provided in a solid state.

4. The light modulation device of claim 1, wherein the electrochromic device comprises:
first and second electrodes;
a first electrochromic layer disposed on the first electrode;
a second electrochromic layer disposed under the second electrode;
an electrolyte layer between the first and second electrochromic layers; and
a hydrogen absorption film between the electrolyte layer and at least one of the first and second electrochromic layers.

5. The light modulation device of claim 4, wherein the electrolyte layer is solid and porous.

6. The light modulation device of claim 1, further comprising:
a protection layer stacked on the substrate,
wherein the light modulating unit is provided inside the protection layer.

7. The light modulation device of claim 1, wherein the electrochromic device is provided in plurality.

8. A light modulation device comprising:
electrochromic devices that are two-dimensionally arranged on a substrate;
a driving unit for driving the electrochromic devices;
a protection layer stacked on the substrate and configured to protect the electrochromic devices; and
a cover configured to seal the electrochromic devices,
wherein each of the electrochromic devices is provided in a solid state, and
wherein a sealing gas is provided to internal spaces between the cover and the electrochromic devices.

9. The light modulation device of claim 8,
wherein the sealing gas comprises at least one of hydrogen and an inert gas.

10. A light modulation device comprising:
a light modulating unit provided on a substrate;
a driving unit electrically connected to the light modulating unit and configured to drive the light modulating unit; and
a cover disposed on the light modulating unit and configured to seal the light modulating unit,
wherein the light modulating unit comprises an electrochromic device, and
wherein the electrochromic device comprises:
first and second electrodes;
a first electrochromic layer disposed on the first electrode;
a second electrochromic layer disposed under the second electrode;
an electrolyte layer between the first and second electrochromic layers; and
a hydrogen absorption film between the electrolyte layer and at least one of the first and second electrochromic layers.

11. The light modulation device of claim 10, wherein an internal space is provided between the cover and the light modulating unit, and a sealing gas comprising hydrogen is provided to the internal space.

12. The light modulation device of claim 11, wherein the sealing gas further comprises an inert gas.

13. The light modulation device of claim 10, wherein each of the first and second electrodes, each of the first and second electrochromic layers, and the electrolyte layer are provided in a solid state.

14. The light modulation device of claim 10, further comprising:
a protection layer stacked on the substrate,
wherein the light modulating unit is provided inside the protection layer.

15. The light modulation device of claim 10, wherein the electrochromic device is provided in plurality.

* * * * *